Jan. 7, 1936.  C. G. OLSON  2,026,649
GEAR TESTING MACHINE
Filed Nov. 22, 1933   4 Sheets-Sheet 1

INVENTOR
CARL G. OLSON
BY
ATT'YS

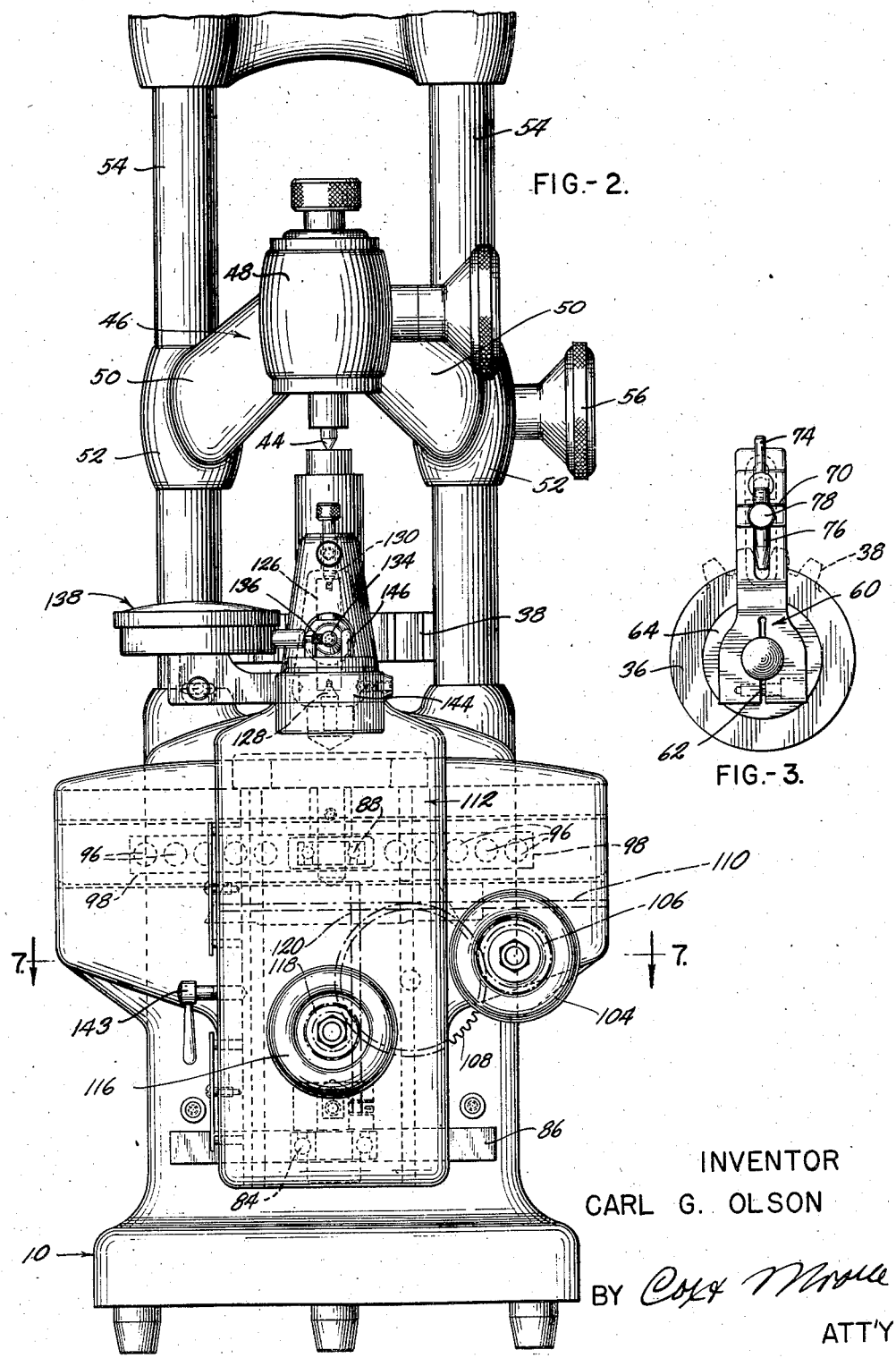

Jan. 7, 1936.  C. G. OLSON  2,026,649
GEAR TESTING MACHINE
Filed Nov. 22, 1933  4 Sheets-Sheet 3
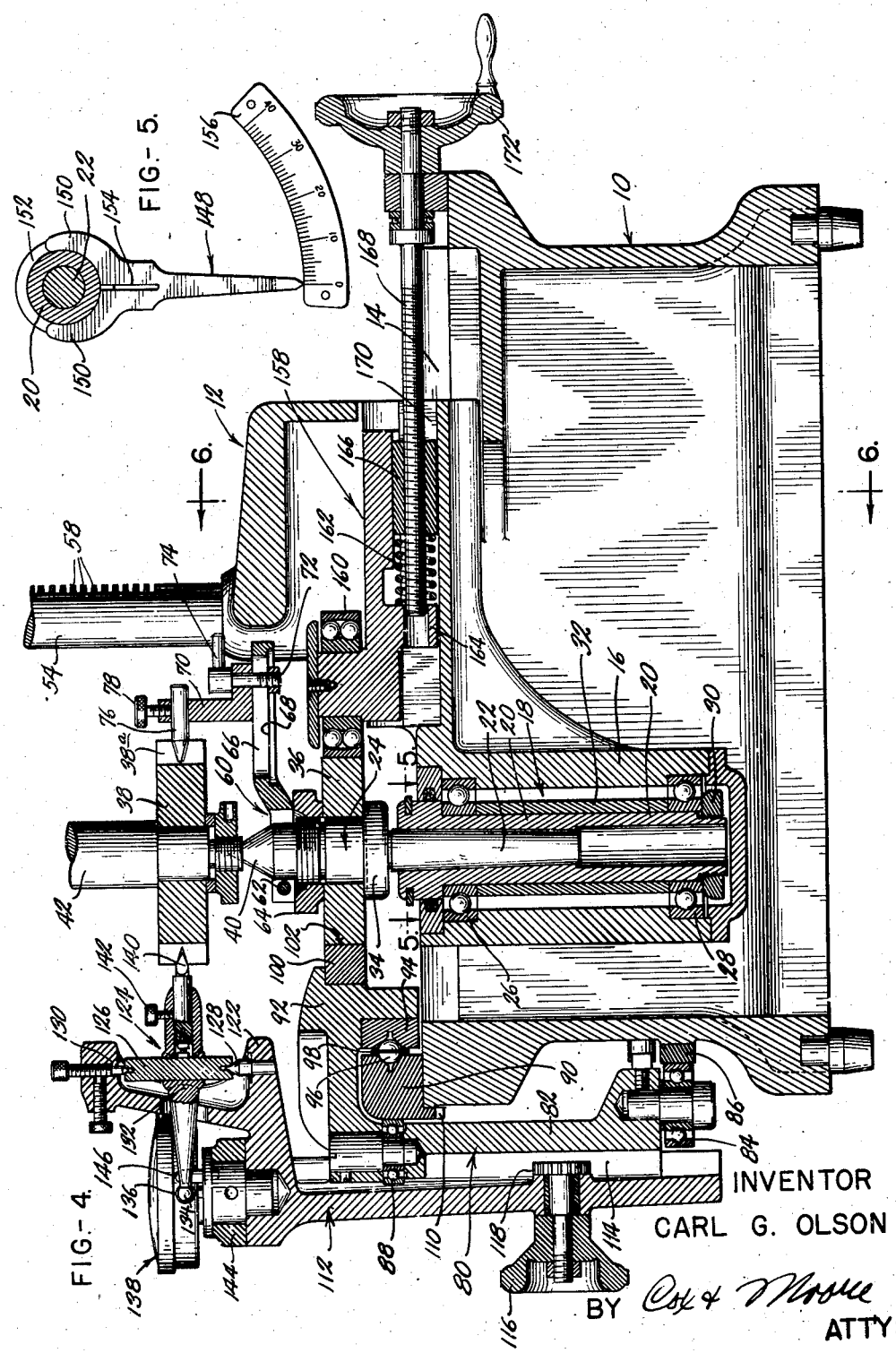
INVENTOR
CARL G. OLSON
BY *Cox & Moore*
ATTYS.

Jan. 7, 1936.  C. G. OLSON  2,026,649
GEAR TESTING MACHINE
Filed Nov. 22, 1933   4 Sheets-Sheet 4

INVENTOR
CARL G. OLSON
BY *Cox & Moore*
ATT'YS.

Patented Jan. 7, 1936

2,026,649

UNITED STATES PATENT OFFICE 2,026,649

GEAR TESTING MACHINE

Carl G. Olson, Chicago, Ill., assignor to Illinois Tool Works, Chicago, Ill., a corporation of Illinois Application November 22, 1933, Serial No. 699,178

16 Claims. (Cl. 33—174)

My invention relates generally to gear testing machines, and more particularly to machines adapted to test teeth of involute gears.

The present invention is related in certain respects to some of my earlier gear testing machines, as for example those disclosed in Patents 1,304,592, 1,554,646, and 1,619,493. The present invention, however, contemplates means which make for increased accuracy in the testing of gears, and also facilitate the ease with which such tests may be made. One of the difficulties or disadvantages which has heretofore been experienced in connection with the use of gear testing machines has been the introduction of errors resulting from lateral displacement of the work or gear supporting spindle. In view of the fact that the gear supporting spindle must, of necessity, be coupled with the mechanism which correlates the rotary movement of the gear blank and the straight line movement of a contactor, said spindle has been subjected to lateral stresses because of inherent deficiencies in structural design. It is, therefore, one of the important objects of the present invention to provide a gear testing machine whereby the above mentioned and other serious disadvantages heretofore experienced may be completely obviated.

More specifically, it is an object of my invention to provide a gear testing machine of the type equipped with a master roller or cylinder corresponding in diameter with the diameter of the base circle of the gear, and in combination with said master cylinder, I propose to employ frictional driving mechanism which is adapted to impart positive rotation to the cylinder without subjecting the gear supporting spindle driven by said cylinder, to lateral streses which would have a tendency to introduce errors.

Still more specifically, it is an object of my invention to so couple the peripheral surface of the base circle cylinder with a reciprocable or tangentially movable driving member, that the force employed to maintain frictional contact between said parts will be transmitted through the cylinder to the tangentially movable member without subjecting the bearings of the work or gear supporting spindle to any overload conditions, which might have a tendency to effect lateral displacement thereof.

Further, my invention contemplates the provision of a testing machine of the type set forth above, wherein the work or gear support and spindle are floating, in the sense that the pressure exerted to make the base circle cylinder roll on a straight surface without sliding is not transmitted through the bearings of the work spindle, but through and by a roller independent of said spindle, and directly engaging the periphery of the base cylinder.

Another object of my invention is to provide an improved indicator device for indicating the degree of rotation of the work spindle, and to this end I propose to provide an indicator member coupled frictionally with the work spindle and adapted to be shifted with respect to said spindle for purposes of adjustment.

Still another object of the invention is to provide an improved reversible indicator mechanism in combination with a contactor, one end of which is adapted to make a point contact with the tooth of the gear, and the opposite extremity of which is adapted for coupling with an indicator mechanism, such for example, as a dial indicator which serves to indicate variations, if any, in the surface contour of the teeth in the gear.

Another object of my invention is to provide an improved, compactly arranged testing machine which necessitates relatively few parts, and which may be economically manufactured by the practice of conventional machine shop methods.

The foregoing, and numerous other objects and advantages will be more apparent from the following detailed description when considered in connection with the accompanying drawings, wherein Fig. 1 is a plan view of a gear testing machine which is representative of one embodiment of my invention;

Fig. 2 is a front elevational view of the machine shown in Fig. 1, with a portion of the upper structure broken away;

Fig. 3 is a detailed plan view of the mechanism which serves to couple the gear to be tested with the base circle cylinder;

Fig. 4 is a central vertical sectional view of the testing machine, taken substantially along the line 4—4 of Fig. 1, the upper portion of the vertical and work spindle being broken away;

Fig. 5 is a detailed plan view of the indicator mechanism which serves to indicate the degree of rotation of the work or gear, said view being taken substantially along the line 5—5 of Fig. 4;

Figure 1:
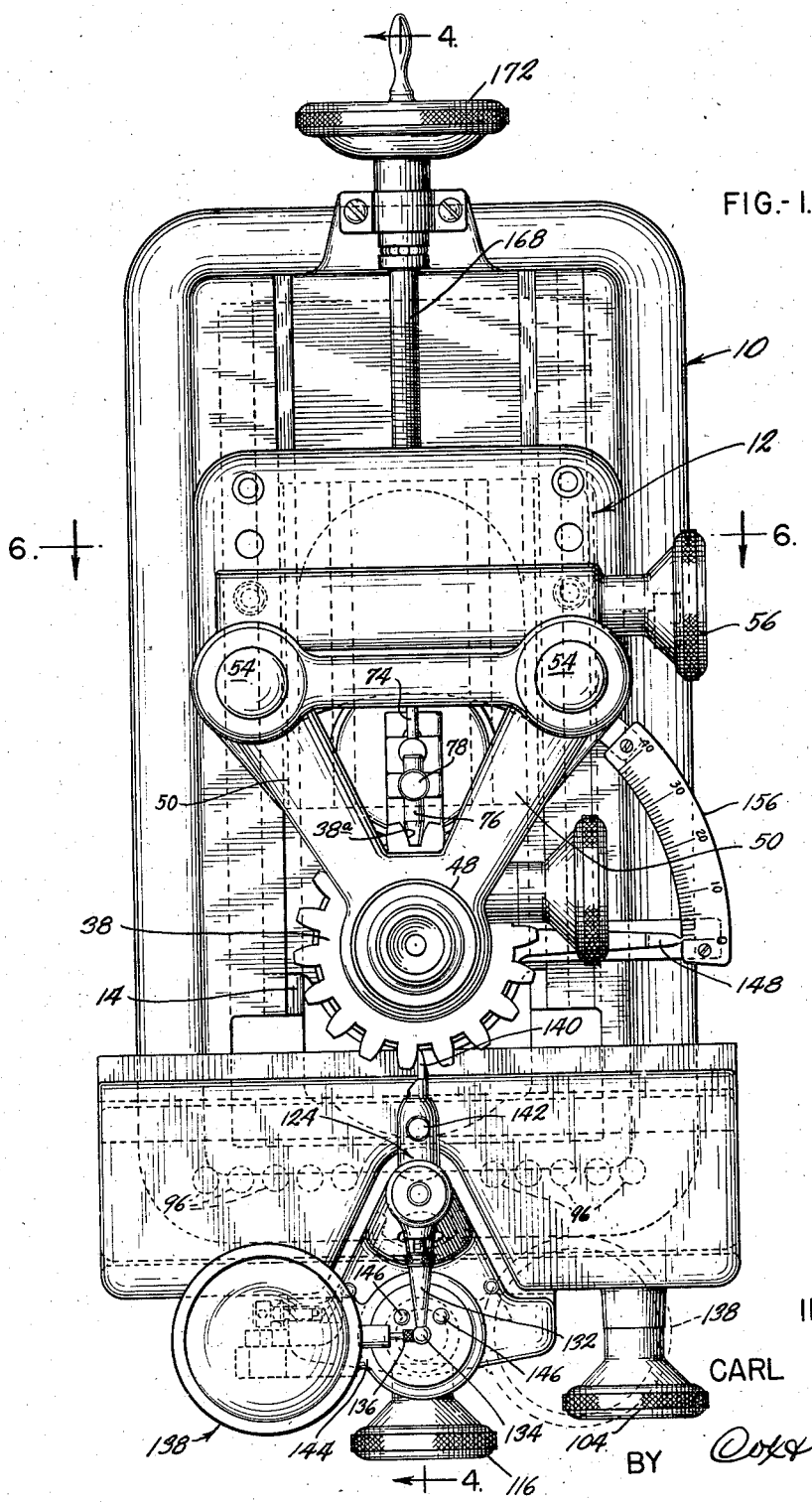
Figure 6:
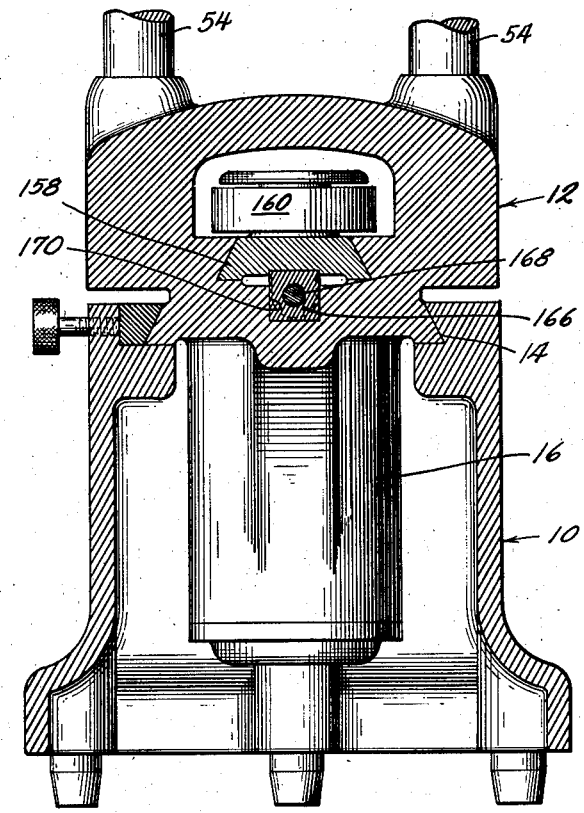
Figure 7:
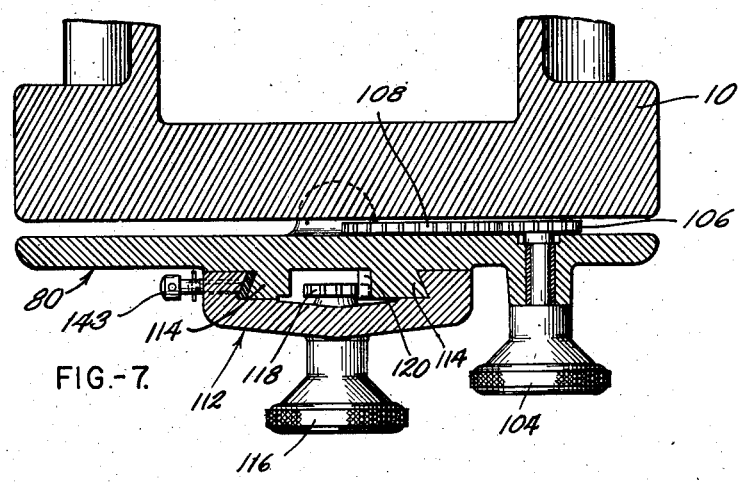

Fig. 6 is a transverse vertical sectional view of the machine taken substantially along the line 6—6 of Figs. 1 and 4; and Fig. 7 is a detailed transverse sectional view taken substantially along the line 7—7 of Fig. 2.

Referring now to the drawings more in detail wherein like numerals have been employed to designate similar parts throughout the various figures, it will be seen that a machine forming one embodiment of the invention includes a suitable base 10. Mounted upon the upper portion of the base 10 is a slide frame 12. This frame 12 is horizontally slidable upon suitable ways 14 provided along the upper portion of the base 10, as clearly shown in Figures 1 and 4. The frame 12 is formed with a depending section 16, and this section 16 houses a rotatable spindle supporting sleeve mechanism 18, Figure 4. This mechanism includes a sleeve 20 adapted at its upper end to receive a tapered shank 22 of a spindle 24. The sleeve 20 is freely rotatable within spaced anti-friction bearings 26 and 28, and a collar 30 serves to clamp the inner races of the bearings 26 and 28, a sleeve 32 and the spindle supporting sleeve 20 together as a rotary unit.

The spindle 24 is provided with a flange 34 which forms the lower support of a cylindrical member 36, which will hereinafter be referred to as the base cylinder, for the reason that the diameter of the cylinder corresponds with the diameter of the base circle of a gear 38 to be tested. The upper extremity of the spindle 24 terminates in a center 40, which receives the lower end of a gear or work supporting spindle 42. The upper end of the spindle 42 is designed to receive a center 44 (Figure 2), which is carried by a tailstock device 46. This tailstock device includes a housing 48 for the spindle proper and a pair of arms 50 diverging therefrom, which terminate in sleeves 52. These sleeves 52 are slidable upon vertical posts or uprights 54. Vertical adjustment of the spindle supporting device 46 along the uprights 44 is occasioned by manipulation of a hand-wheel 56. The hand-wheel 56 connects with mechanism which meshes with rack teeth 58 (Figure 4) provided along the uprights 54 to cause vertical movement of the device 46.

Mechanism for coupling the base cylinder 36 to the supported gear 38 comprises a yoke member 60 (Figures 3 and 4), which is adapted to be clamped to the upper portion of the spindle 24 by means of a suitable clamping screw 62. This yoke member being positioned immediately above a nut 64, which is tightened against the base cylinder 36 to couple said cylinder with the spindle 24. The yoke member 60 is formed integral with a radial arm 66 provided with a longitudinal slot 68. A block 70 is adapted to be adjustably clamped to the arm 66 by means of a bolt 72, which passes through the slot 68. The block 70 may be radially adjusted by merely turning a handle 74 connected with the bolt 72. The upper portion of the block 70 carries a pin 76 which is secured in position by means of a screw 78. This pin 76 is tapered at one end so as to project within the space between the gear teeth, as indicated in Figure 3. In this manner any rotation experienced by the base cylinder or drum 36 will be imparted to the gear 38.

Horizontally slidable upon the front end of the base 10 is a frame 80. This frame 80 is provided with a depending portion 82, which carries a roller 84. The roller 84 rolls along the flat surface of a strip 86 mounted upon the front end of the base 10. The upper portion of the frame 80 also carries an anti-friction roller 88, which is adapted to roll along the outer flat surface of a race bar 90 secured to the upper portion of the base 10. The frame 80 is formed with a section 92, which carries a horizontally disposed race bar 94. This bar 94 is companion to and superimposes the bar 90, as clearly indicated in Figure 4.

A plurality of ball bearings 96 are interposed between and form an anti-friction bearing for the bar 94, which bar is adapted to be shifted horizontally by mechanism, later to be described. The ball bearings 96 are maintained in spaced relation by means of a suitable ball retainer 98. A hardened bar 100 is secured to the section 92 of the frame 80, and presents a friction surface 102, which engages the peripheral surface of the base cylinder 36. It will thus be apparent that if the bar 100 is moved horizontally, rotation will be imparted to the base cylinder 36.

Horizontal movement may be imparted to the frame 80 by manipulating a hand-wheel 104 at the front end of the machine. This wheel 104 is connected with a gear 106, which meshes with a larger gear 108, the latter gear meshing with rack teeth 110 provided along the underside of the race bar 90. The race bar being stationary, it will be apparent that when the gear 108 rotates, horizontal movement will be imparted to the frame 80.

An auxiliary frame or slide 112 is vertically slidable upon a guide 114 of the frame 80. Vertical movement of this slide 112 is occasioned by turning a hand-wheel 116, which is coupled with a pinion or gear 118 meshing with rack teeth 120 formed within the guide 114 (Figures 2 and 7). The upper portion of the frame 112 is provided with a lateral extension 122, which serves as a support for a contactor device 124.

This contactor device 124 includes a central vertical shaft 126 secured between a pair of centers 128 and 130 (Figure 4). The shaft 126 forms the support for an elongated member 132, one end of which presents a spherical element 134 adapted to be engaged by a plunger 136 of a dial indicator 138. The opposite end of the elongated member 132 is recessed to provide a support for the contactor proper 140. The contactor 140 may be adjustably secured within the member 132 by means of a suitable set screw 142. This contactor 140 is designed to engage the surface of the teeth 38a in the gear 38, as clearly indicated in Figures 1 and 4. It will be noted that the point of contact between the member 140 and the teeth 38a is in proper alinement with the friction surface 102, which engages the peripheral surface of the base cylinder 36. The mechanism for effecting the vertical adjustment of the slide 112 serves to adjust the vertical position of the contactor 140 with respect to the work to be tested. It will also be seen that a yieldable set screw 143 (Figures 2 and 7) is provided to positively secure the slide 112 in a position of adjustment. From the foregoing it will be apparent that if rotation is imparted to the base cylinder 36 by the friction surface 102 without slippage, and the contactor is properly positioned with respect to the surface on a tooth 38a, deviations, if any, from the true involute contour will be indicated by the dial indicator 138.

Attention is now directed to the fact that the dial indicator 138 is mounted upon an arm 144, which swivels about a vertical axis passing through the center of the sphere or ball 134 of the contactor member 132. In this manner the dial indicator 138 may be swiveled in such a manner that the indicator may be reversed to contact on either side of the ball. It will be noted that a pair of pins 146 disposed on opposite sides of the elongated member 132 (Figure 1) serve to limit the degree of movement of said member.

In order to correlate the degree of rotation with the readings made on the dial indicator 138, I provide an indicator finger 148 (Figures 1, 4, and 5). One end of the finger 148 is formed with a pair of arms 150, which are adapted to frictionally engage within a peripheral recess 152 (Figures 4 and 5) provided at the upper portion of the sleeve 20. The finger 148 is provided with a slit 154 to facilitate the tensioning of the arms or fingers 150. The frictional engagement between the arms 150 and the adjacent periphery of the sleeve 20 is sufficient to securely hold the finger in place, but is sufficiently impositive to permit the finger to be manually shifted for purposes of adjustment. A suitable arcuate graduated scale 156, which indicates to a maximum of 40 degrees, is carried by the slide 12. Before a test is started, the finger or pointer 148 is first moved to the zero position as indicated in Figures 1 and 5.

Attention is now directed to the means which I provide for maintaining frictional contact between the periphery of the base cylinder 36 and the friction surface 102. This mechanism includes an auxiliary slide 158, which is mounted within the slide 12. The upper inner portion of the slide 158 carries an anti-friction roller 160, which engages the periphery of the base cylinder 36 at a point diametrically opposite the point of engagement of said cylinder with the friction surface 102. The roller 160 is normally urged into contact with the cylinder 36 through the agency of a coiled spring 162, which is interposed between a depending lug 164 of the slide frame 158 and a sleeve 166, which is square in cross-section (see Figure 6). This sleeve 166 is threaded to receive companion threads on a screw shaft 168 and is longitudinally slidable within a recess 170 provided in the slide 12. By merely turning a hand-wheel 172 mounted at the outer end of the threaded shaft 168, the sleeve 166 may be moved in either direction. If moved to the left (Figure 4), the compressive action of the spring 162 upon the slide 158 is increased.

At this point particular attention is directed to the fact that the pressure exerted to cause the base cylinder 36 to, in effect, roll on the straight friction surface 102 without slipping, is not transmitted through the bearings of the work spindle, but is transmitted directly through the cylinder 36 interposed between the bar 100 and the roller 160. By employing the auxiliary anti-friction roller 160 as the means for imparting pressure against the periphery of the base cylinder 36, frictional contact is reduced to a minimum. That is to say, by using the auxiliary roller 160 contacting directly with the base cylinder 36 diametrically opposite to the point of contact between the cylinder and the friction surface, all strain on the bearing of the work spindle is relieved. The roller 160 is urged toward the cylinder through the pressure of the spring 162, and this pressure is transmitted to the point of contact between the cylinder 36 and the friction surface 102. Thus it may be said that the base cylinder and the work arbor become in a sense floating between the roller 160 and the friction surface 102, and are dependent on the rotary bearings of the spindle for alinement purposes only. The bearing of the roller 160 has less friction than the bearing of the spindle, and therefore turns more freely. In addition to this, the roller 160 may be larger than the base cylinder 36 when said base cylinder is used for a relatively small gear. It will also be noted that the roller 160 is located at the same height as the base cylinder and the friction surface. The pressure of the roller bearing is, therefore, in a straight line directly perpendicular to the surface 102. This should be distinguished from devices wherein the pressure is not exerted along a straight line as described above.

Obviously the invention is not limited to the specific structural details disclosed herein, but is capable of other modifications and changes without departing from the spirit and scope thereof.

Having thus described my invention, what I claim as new and desire to secure by Letters Patent is:

1. A gear testing machine including a base, a work supporting frame slidably supported on said base, an indicator support slidable transversely of said work support, an indicator mechanism on said indicator support including a contactor for engaging the teeth of a supported gear, means movable with said indicator support having a friction surface, a cylindrical member corresponding in diameter with the diameter of the base circle of the gear to be tested and rotatable as a unit with the gear to be supported, a mounting for said cylinder member, and pressure applying means for maintaining frictional contact between said cylindrical member and said friction surface, said latter means acting on the periphery of said cylindrical member at a point diametrically opposite the point of engagement of said cylindrical member with said friction surface to thereby prevent the transmission of pressure to the work support.

2. A gear testing machine including a base, a work supporting frame slidably supported on said base, an indicator support slidable transversely of said work support, an indicator mechanism on said indicator support including a contactor for engaging the teeth of a supported gear, means movable with said indicator support having a friction surface, a cylindrical member corresponding in diameter with the diameter of the base circle of the gear to be tested and rotatable as a unit with the gear to be supported, a mounting for said cylindrical member, and means for yieldably maintaining frictional contact between said cylindrical member and said friction surface, said latter means acting on the periphery of said cylindrical member at a point diametrically opposite the point of engagement of said cylindrical member with said friction surface to thereby prevent the transmission of said pressure to the work support.

3. A gear testing machine including a base, a work supporting frame slidably supported on said base, an indicator support slidable transversely of said work support, an indicator mechanism on said indicator support including a contactor for engaging the teeth of a supported gear, means movable with said indicator support having a friction surface, a cylindrical member corresponding in diameter with the diameter of the base circle of the gear to be tested and rotatable as a unit with the gear to be supported, a mounting for said cylindrical member, and means including a roller for maintaining frictional contact between said cylindrical member and said friction surface, said roller acting on the periphery of said cylindrical member at a point diametrically opposite the point of engagement of said cylindrical member with said friction surface to thereby prevent the transmission of said pressure to the work support.

4. A gear testing machine including a base, a work supporting frame slidably supported on said base, an indicator support slidable transversely of said work support, an indicator mechanism on said indicator support including a contactor for engaging the teeth of a supported gear, means movable with said indicator support having a friction surface, a cylindrical member corresponding in diameter with the diameter of the base circle of the gear to be tested and rotatable as a unit with the gear to be supported, a mounting for said cylindrical member, and means including a member for exerting a force against the periphery of said cylindrical member, said force acting at substantially right angles to and intersecting the frictional surface engaged by said cylindrical member.

5. A gear testing machine including a base, a work support horizontally movable on said base, an indicator support horizontally movable on said base transversely of said work support, an indicator mechanism on said indicator support including a contactor for engaging the teeth of a supported gear, a second indicator mechanism for indicating the degree of rotation experienced by the gear, means movable with said indicator support having a friction surface, a cylindrical member corresponding in diameter with the diameter of the base circle of the gear to be tested, said cylindrical member movable as a unit with said work support and adapted in response to engagement with said friction surface to impart rotation to a supported gear, a mounting for said cylindrical member movable as a unit with said work support, and means for exerting a pressure against said cylinder to maintain frictional engagement between the cylinder and said frictional surface, said latter means being constructed and arranged to exert said pressure without transmitting said pressure to the work support, whereby to preclude the introduction of errors which might otherwise occur.

6. A gear testing machine including a base, a work support horizontally movable on said base, an indicator support horizontally movable on said base transversely of said work support, an indicator mechanism on said indicator support including a contactor for engaging the teeth of a supported gear, a second indicator mechanism for indicating the degree of rotation experienced by the gear, means movable with said indicator support having a friction surface, a cylindrical member corresponding in diameter with the diameter of the base circle of the gear to be tested, said cylindrical member movable as a unit with said work support and adapted in response to engagement with said friction surface to impart rotation to a supported gear, a mounting for said cylindrical member movable as a unit with said work support, and means acting directly upon the cylindrical member at a point disposed diametrically opposite the point of engagement of said member with said friction surface to maintain frictional engagement between the parts without transmitting said pressure to the work support.

7. A gear testing machine including a base, a working support horizontally movable on said base, an indicator support horizontally movable on said base transversely of said work support, an indicator mechanism on said indicator support including a contactor for engaging the teeth of a supported gear, a second indicator mechanism for indicating the degree of rotation experienced by the gear, means movable with said indicator support having a friction surface, a cylindrical member corresponding in diameter with the diameter of the base circle of the gear to be tested, said cylindrical member movable as a unit with said work support and adapted in response to engagement with said friction surface to impart rotation to a supported gear, a mounting for said cylinder member movable as a unit with said work support and means including a roller directly engaging the periphery of said cylindrical member at a point oppositely disposed from the point of engagement of said cylindrical member with said friction surface for exerting pressure to maintain frictional contact between the cylindrical member and friction surface.

8. A gear testing machine including a base, a work support slidably mounted upon said base, said support including a spindle for carrying a gear to be tested, an indicator support slidable on said base transversely with respect to the work support, an indicator mechanism on said indicator support including a contactor for engaging the teeth of a supported gear, means movable with said indicator support having a friction surface, a cylindrical member corresponding in diameter with the diameter of the base circle of the gear to be tested, said cylindrical member being movable as a unit with said work support and adapted in response to engagement with said friction surface to impart rotation to a supported gear, a mounting for said cylindrical member movable as a unit with said work support, an auxiliary support slidably mounted within the work support, and means carried by said auxiliary support adapted to act directly against the periphery of said cylindrical member to maintain the frictional contact between said cylindrical member and said friction surface.

9. A gear testing machine including a base, a work support slidably mounted upon said base, said support including a spindle for carrying a gear to be tested, an indicator support slidable on said base transversely with respect to the work support, an indicator mechanism on said indicator support including a contactor for engaging the teeth of a supported gear, means movable with said indicator support having a friction surface, a cylindrical member corresponding in diameter with the diameter of the base circle of the gear to be tested, said cylindrical member being movable as a unit with said work support and adapted in response to engagement with said friction surface to impart rotation to a supported gear, a mounting for said cylindrical member movable as a unit with said work support, an auxiliary support slidably mounted within the work support, means carried by said auxiliary support adapted to act directly against the periphery of said cylindrical member to maintain the frictional contact between said cylindrical member and said friction surface, and yieldable means for urging said auxiliary support in a direction to maintain contact between the cylindrical member and said friction surface.

10. A gear testing machine including a base, a work support slidably mounted upon said base, said support including a spindle for carrying a gear to be tested, an indicator support slidable on said base transversely with respect to the work support, an indicator mechanism on said indicator support including a contactor for engaging the teeth of a supported gear, means movable with said indicator support having a friction surface, a cylindrical member corresponding in diameter with the diameter of the base circle of the gear to be tested, said cylindrical member being movable as a unit with said work support and adapted in response to engagement with said friction surface to impart rotation to a supported gear, a mounting for said cylindrical member movable as a unit with said work support, an auxiliary support slidably mounted within the work support, means carried by said auxiliary support adapted to act directly against the periphery of said cylindrical member to maintain the frictional contact between said cylindrical member and said friction surface, yieldable means for urging said auxiliary support in a direction to maintain contact between the cylindrical member and said friction surface, and means for adjustably controlling the force exerted by said yieldable means.

11. A gear testing machine including a base, a work support movable on said base for carrying a gear to be tested, an indicator support movable on said base transversely of said work support, an indicator mechanism on said support including a contactor for engaging the teeth of a supported gear, said contactor comprising a lever mechanism having an intermediate pivot, the contactor proper being positioned on one side of said pivot and a ball member on the opposite side adapted for engagement with the actuating member of an indicator, and an indicator equipped with an actuating member engageable with said ball, said indicator swivelly mounted about an axis passing through the center of said ball whereby to enable said indicator to be shifted from one side of the contactor to the other without necessitating disassembly of the parts.

12. A gear testing machine including a base, a work support movable on said base for carrying a gear to be tested, an indicator support movable on said base transversely of said work support, an indicator mechanism on said support including a contactor for engaging the teeth of a supported gear, said contactor comprising a lever mechanism having an intermediate pivot, the contactor proper being positioned on one side of said pivot and a ball member on the opposite side adapted for engagement with the actuating member of an indicator, and an indicator equipped with an auxiliary support for carrying the indicator, said support being swivelly mounted about an axis passing through the ball of the contactor whereby to enable said indicator to be shifted to opposite sides of the contactor.

13. A gear testing machine including a work support, an indicator support, said work support and indicator support being relatively shiftable, an indicator mechanism on said indicator support including a contactor for engaging the teeth of a gear carried by the work support, means having a plane friction surface associated with one of said supports, a roller having a peripheral friction surface associated with the other of said supports, a cylindrical member corresponding in diameter with the diameter of the base circle of the gear to be tested, and rotatable as a unit with a gear carried by the work support, said plane friction surface and peripheral friction surface engaging the periphery of said cylindrical member at diametrically opposite positions, the relative shifting between the work support and indicator support serving to cause rotation of said cylindrical member, and means for urging at least one of said friction surfaces into engagement with the periphery of said cylindrical member without subjecting a supported gear to lateral displacement.

14. A gear testing machine including a work support, an indicator support, said work support and indicator support being relatively shiftable, an indicator mechanism on said indicator support including a contactor for engaging the teeth of a gear carried by the work support, means having a plane friction surface associated with one of said supports, a roller having a peripheral friction surface associated with the other of said supports, a cylindrical member corresponding in diameter with the diameter of the base circle of the gear to be tested, and rotatable as a unit with a gear carried by the work support, a spindle providing a mounting for said cylindrical member, the axis of which is positioned intermediate and extends transversely of said friction surfaces, said friction surfaces engaging the peripheral surface of said cylindrical member at diametrically opposite positions, one of said friction surfaces providing an abutment, and means for urging the other friction surface toward the abutment surface whereby to prevent the transmission of forces which would have a tendency to laterally displace a supported gear.

15. A gear testing machine including a work support, an indicator support, said work support and indicator support being relatively shiftable, an indicator mechanism on said indicator support including a contactor for engaging the teeth of a gear carried by the work support, means having a plane friction surface associated with one of said supports, a roller having a peripheral friction surface associated with the other of said supports, a cylindrical member corresponding in diameter with the diameter of the base circle of the gear to be tested, and rotatable as a unit with a gear carried by the work support, said plane friction surface and peripheral friction surface engaging the periphery of said cylindrical member at diametrically opposite positions, the relative shifting between the work support and indicator support serving to cause rotation of said cylindrical member, and means for urging said peripheral friction surface into engagement with the periphery of said cylindrical member, the oppositely disposed plane surface providing an abutment whereby the pressure thus applied to said cylindrical member is not transmitted to the supported gear.

16. A gear testing machine including a base, a work supporting frame mounted on said base, a spindle rotatably supported by said frame, a cylindrical member corresponding in diameter with the diameter of the base circle of the gear to be tested, said cylindrical member being mounted upon and rotatable with said spindle, means providing a coupling between said spindle and the gear to be tested whereby to cause said cylindrical member and gear to rotate as a unit, an indicator support, said indicator support and work supporting frame being relatively shiftable, an indicator mechanism on said indicator support including a contactor for engaging the teeth of a supported gear, means coupled with said indicator support having a friction surface, said friction surface being adapted to contact the periphery of said cylindrical member, a member having a friction surface adapted to engage the periphery of said cylindrical member at a position diametrically opposite to the point of contact between said cylindrical member and said first mentioned friction surface, one of said friction surfaces providing an abutment, and means for urging the other friction surface into engagement with the periphery of said cylindrical member and in a direction toward the oppositely disposed friction surface.

CARL G. OLSON.